United States Patent [19]

Hanson

[11] Patent Number: 4,461,889
[45] Date of Patent: Jul. 24, 1984

[54] SEPARATION OF SOLID POLYMERS AND LIQUID DILUENT

[75] Inventor: Donald O. Hanson, Bartlesville, Okla.

[73] Assignee: Phillips Petroleum Company, Bartlesville, Okla.

[21] Appl. No.: 187,872

[22] Filed: Sep. 17, 1980

[51] Int. Cl.³ .............................................. C08F 6/12
[52] U.S. Cl. .................................. 528/498; 528/501; 528/502; 528/503
[58] Field of Search ...................... 528/501, 502, 498

[56] References Cited

U.S. PATENT DOCUMENTS

| | | | |
|---|---|---|---|
| 2,825,721 | 3/1958 | Hogan | 528/501 |
| 2,860,125 | 11/1958 | Lanning | 526/106 |
| 2,930,784 | 3/1960 | Hanson | 528/501 X |
| 2,952,671 | 9/1960 | Cottle | 528/501 |
| 2,964,513 | 12/1960 | Dale | 528/501 X |
| 3,280,090 | 10/1966 | Scoggin | 528/501 X |
| 3,324,093 | 6/1967 | Alleman | 528/501 X |
| 3,454,545 | 7/1969 | Scoggin | 528/501 X |
| 3,954,910 | 5/1976 | Kropp | 528/501 X |
| 4,217,431 | 8/1980 | Zacher | 526/68 |

Primary Examiner—C. A. Henderson

[57] ABSTRACT

Method and apparatus for the separation of solid polymer and liquid diluent comprising the use of a filter vessel from which a major portion of the diluent can be recovered directly as liquid for recycle to the polymerization process.

8 Claims, 1 Drawing Figure

SEPARATION OF SOLID POLYMERS AND LIQUID DILUENT

BACKGROUND OF THE INVENTION

The present invention relates to a method and apparatus for separating solid polymer and liquid diluent from a mixture of those materials.

In many polymerization processes for the production of normally solid polymer, a stream is formed which is a slurry of particulate polymer solids suspended in a liquid medium, ordinarily the reaction diluent. A routine technique for separating the polymer and the diluent has involved flashing the diluent into vapor by reducing the pressure on the slurry. Such a technique is disclosed in U.S. Pat. No. 3,152,872. In order to reuse the recovered diluent in the polymerization process, it has been necessary to condense the diluent vapors to liquid. The compression and condensation of the recovered vapors is a significant part of the total expense involved in the polymerization process.

An object of the present invention is to reduce the expense involved in the reuse of diluent that is separated from a slurry of a polymerization process.

Other objects, advantages, and features of the present invention will be apparent to those skilled in the art from the following discussion.

SUMMARY OF THE INVENTION

In accordance with the present invention there is provided a method for separating polymer solids from the hydrocarbon diluent in a polymerization effluent comprising accumulating a given volume of said effluent in a first vessel, then exposing that volume of said effluent to a pressure drop by allowing said effluent to flow into the upper portion of a second vessel, said second vessel being divided into an upper portion and a lower portion by a filter capable of retaining said polymer solids and said second vessel having such volume that the major portion of the diluent remains in the liquid phase after said pressure drop; withdrawing liquid diluent from the lower portion of said second vessel and then withdrawing polymer solids from the upper portion of said second vessel.

DETAILED DESCRIPTION OF THE INVENTION

Figure 1:
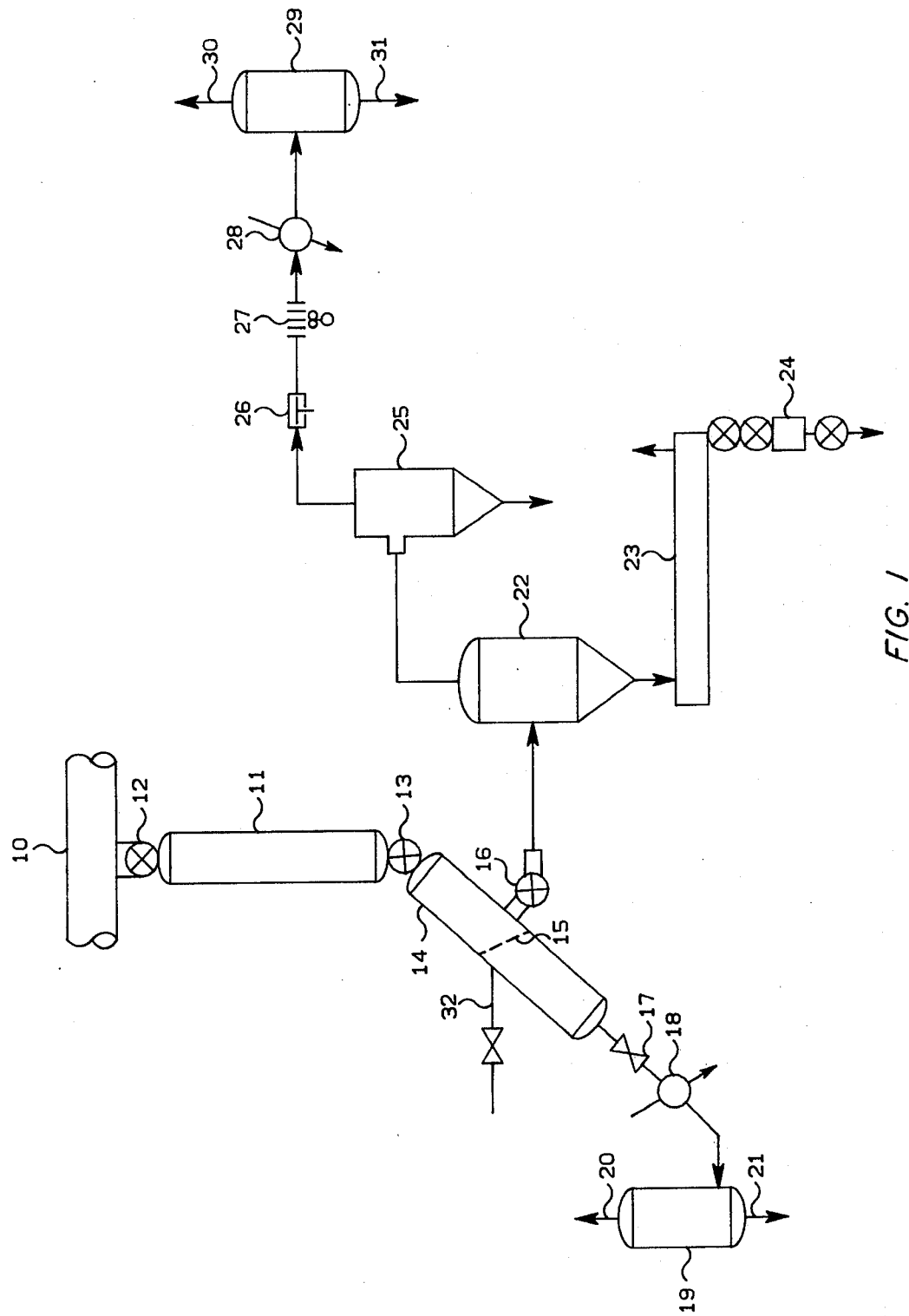
FIG. 1 is a schematic drawing showing the process for separating polymer from diluent in accordance with the present invention.

The method and apparatus of this invention can be used in any process requiring a separation of polymer solids from a mixture of these solids in a liquid diluent. It is particularly significant where the diluent is an inflammable hydrocarbon which is recovered for reuse in a catalytic process. Many olefin polymerization processes produce such a slurry where a separation of this type is required. Of particular importance are polymerization processes such as those described in U.S. Pat. No. 2,825,721 which issued to Hogan et al. on Mar. 4, 1958. The invention is especially useful in those polymerization processes of the type disclosed in abandoned U.S. patent application Ser. No. 590,567, filed June 11, 1956 by G. T. Leatherman and C. V. Detter, the disclosure of which is incorporated herein by reference. In such processes ethylene or mixtures of ethylene with other unsaturated hydrocarbons are contacted with a suspension of chromium oxide-containing catalyst in a liquid hydrocarbon diluent, the contacting occurring at a temperature such that substantially all of the polymer produced is insoluble in the diluent and is in solid particle form, the particles being substantially non-tacky and non-agglutinative and suspended in the liquid diluent.

Typically the olefins employed in olefin polymerizations are 1-olefins having up to 8 carbon atoms per molecule and no branching nearer the double bond than the 4-position. Examples of such olefins include propylene, butene-1, 1-pentene, 1-octene, and 1,3-butadiene. The liquid hydrocarbon diluents which are suitable include paraffins having 3 to 12, preferably 3 to 8 carbon atoms per molecule, such as propane, n-butane, n-pentane, isopentane, n-hexane, isooctane and the like. Some naphthenes can be present in the diluent and mixtures of paraffins and isoparaffins can be employed. Naphthenic hydrocarbons having from 5 to 6 carbon atoms in a naphthenic ring which can be maintained in a liquid phase under the polymerization conditions can be employed such as cyclohexane, cyclopentane, methylcyclopentane, ethylcyclohexane, and the like. The temperature of the polymerization depends upon the hydrocarbon diluent chosen and is generally in the range of about 230° F. and below. The pressure of the reaction is sufficient to maintain the diluent in a liquid phase and is normally about 100 to 700 psia. A slurry containing as high as 55 weight percent particulate polymer in the hydrocarbon diluent can be formed by this process and treated according to this invention.

A further understanding of the present invention will be provided by referring to FIG. 1. Polymerization effluent is carried out in a loop reactor a section of which is illustrated as 10 in FIG. 1. Polymer slurry in the loop 10 passes into a settling leg 11 which has valves 12 and 13 respectively at its upper and lower ends. Connected to the lower end of the settling leg is a filter vessel 14 having a filter means 15 which divides the filter vessel into an upper portion and a lower portion. An outlet in the upper portion of the filter vessel contains a valve 16 and an outlet in the lower portion of the filter vessel contains a valve 17.

In the separation process valve 13 is closed and valve 12 opened to allow a selected amount of polymer solids to accumulate in the settling leg 11. After the desired amount of solids have accumulated, typically when the settling leg contains around 55 weight percent polymer solids, valve 12 is closed and valve 13 is opened to allow a pressure drop as the material in the settling leg flows into the additional volume of the filter vessel. The volume of the filter vessel is such that the major portion of the diluent remains in the liquid phase after said pressure drop. Upon equilibration of the pressure, valve 17 is opened to allow liquid diluent to be withdrawn from the lower portion of the filter vessel 14. The withdrawal of liquid from the vessel 14 is done under pressure conditions such that there is no substantial amount of additional vaporization of the diluent, and preferably under such pressure that the diluent vapors accompanying said liquid can be condensed over an indirect heat exchanger 18 using a cooling fluid having a temperature in the range of about 30° to about 45° C.

The liquid diluent is then passed to a knockout drum 19 where lighter gaseous materials are allowed to escape via line 20 and the diluent withdrawn via line 21 for use as makeup diluent in the polymerization process.

Once the pressure in the filter vessel has again reequilibrated valve 17 is closed and valve 16 is opened so that polymer solids can be removed from the upper portion of the filter vessel for recovery to be described in more detail shortly.

It is noted that for the purpose of clear illustration the segment of the loop reactor 10, the settling leg 11, and the filter vessel 15 are drawn in an exaggerated size relative to the other features illustrated.

The filter vessel in a preferred embodiment is as shown in the drawing, i.e., an elongated vessel tilted slightly from vertical. The vessel being tilted so that polymer solids may be more easily removed via valve 16. Preferably for the same reason the filter is also tilted slightly from horizontal. However, any suitable arrangement could be employed. For example, one could use a vertical vessel and a downwardly inclining frustoconical filter element having an outlet conduit for removing polymer solids from the lower end of the filter means.

It is generally preferable to insure that the filter be of such dimensions and so positioned that it does not become exposed to diluent vapor until the major portion of the liquid diluent has passed into the lower portion of the filter vessel. Such an arrangement assures that the gaseous diluent will help drive the liquid through the filter when valve 17 is opened.

After the polymer solids have been removed from the filter vessel, valves 16 and 13 are closed and valve 12 opened to start another separation cycle.

The polymer solids from the filter vessel can be recovered using routine procedures. For example, the polymer solids can be charged to a flash tank 22 wherein diluent associated with the polymer is flashed to a vapor. Solid polymer is removed from the bottom of flash chamber 22 into a conveyor system 23 in which residual amounts of hydrocarbon are removed therefrom and then the solids are dropped through a discharge conduit 24 from whence the polymer can be transported to storage.

The vaporized diluent from the flash tank 22 are passed into a cyclone collector 25. Entrained polymer particles in the vapor stream are removed from the vapor and passed out of the collector to a point of storage from which they can if desired be recombined with other of the recovered polymer. The diluent vapors after having the polymer particles removed therefrom pass overhead to a compressor 26 and the compressed vapors are passed through an air-fin cooler 27 wherein at least a portion of the compressed vapors are condensed to liquid. The diluent is then passed through a condenser 28 wherein most of the remaining vapors are condensed and then to a knockout drum 29. Uncondensed diluent vapors and gases are removed overhead from the drum 29 via line 30. The condensate of the drum can be withdrawn via line 31 and recycled back to the polymerization process as makeup diluent.

In a preferred embodiment, the filter vessel 14 is provided with line 32 for conveying hot diluent into the vessel for cleaning the filter 15 by backwashing. Generally, the diluent used for backflushing will be at a temperature above the melting point of the polyer, i.e., 250°–275° F. (121°–135° C.) in order to melt and dislodge any polymer particles and thereby clean filter element 15. It is convenient to use a spraying device to spread the hot diluent over the filter.

The benefits of the present invention will now be illustrated using calculations based on typical operating conditions used in the particle form polymerization of an olefin such as polyethylene. Assuming that polymer is being manufactured in the loop reactor at a rate of about 17,500 pounds/hour, when the slurry in the settling leg 11 has been thickened to 55 weight percent solids, the leg will contain about 13,818 pounds/hour of isobutane plus about 500 pounds/hour of ethylene. (For the purpose of this example, the ethylene will be lumped together with the isobutane as diluent.) The conditions in the settling leg, viz. about 650 psia and about 225° F., are such that the diluent is substantially in the liquid phase. When valve 13 is opened, the volumes of the settling leg 11 and the filter vessel 14 are such that when the equilibration is reached, the pressure in the filter vessel is about 310 psia and the temperature about 220° F. At these conditions, a major portion of the diluent is still in the liquid phase. The quantity of diluent that is recovered as liquid diluent from the filter vessel provides a reduction in the expense that would be required if that same quantity of diluent were flashed and then compressed and cooled to obtain liquid suitable for recycle. The diluent vapor removed via valve 17 is also at sufficiently high pressure that it can be readily condensed using cooling water in heat exchanger 18. It is estimated that as much as 67 percent of the total diluent can be recovered via valve 17.

The remaining diluent and the polymer is recovered from the filter vessel via valve 16.

As will be evident to those skilled in the art various modifications can be made in our invention without departing from the spirit and scope thereof.

What is claimed is:

1. In a process wherein mono-1-olefin having 2 to 8 carbon atoms per molecule is polymerized in a continuous loop polymerization reactor in a liquid diluent in the presence of a suitable polymerization catalyst under such conditions that substantially all of the polymer produced is insoluble in the diluent and is in the form of solid particles of polymer wherein a slurry of said polymer solids and diluent is accumulated in a settling leg of said loop reactor, an improved method for separating the polymer solids and the diluent comprising shutting off communication between the reaction zone of said loop reactor and said settling leg when the desired level of solids have accumulated in the settling leg, passing the accumulated polymer-diluent slurry located in the settling leg to a filter vessel, filtering polymer solids from the liquid diluent in the filter vessel under pressure conditions such that the major portion of the liquid diluent from the settling leg remains in the liquid phase.

2. A method according to claim 1 wherein the liquid diluent is recovered from the filter vessel under conditions such that there is no substantial amount of additional vaporization of the diluent.

3. A method according to claim 2 wherein at least a portion of the liquid diluent recovered from the filter vessel is recycled for use as diluent in the polymerization reactor.

4. A method according to claim 2 wherein the liquid diluent is recovered from the filter vessel under conditions such that diluent vapors accompanying said liquid can be condensed using indirect heat exchange with a cooling fluid having a temperature in the range of about 30° C. to about 45° C.

5. A method according to claim 4 wherein at least a portion of the liquid diluent recovered from the filter vessel is recycled foruse as diluent in the polymerization reactor.

6. A method according to claim 5 wherein indirect heat exchange with a cooling fluid having a temperature in the range of 30° C. to about 45° C. is used to condense diluent vapors accompanying diluent liquid recovered from said filter vessel.

7. A method according to claim 6 wherein said diluent comprises a paraffin having 3 to 12 carbon atoms.

8. A method according to claim 6 wherein said polymer comprises a polymer of ethylene and said diluent comprises isobutane.

* * * * *